Patented Nov. 25, 1924.

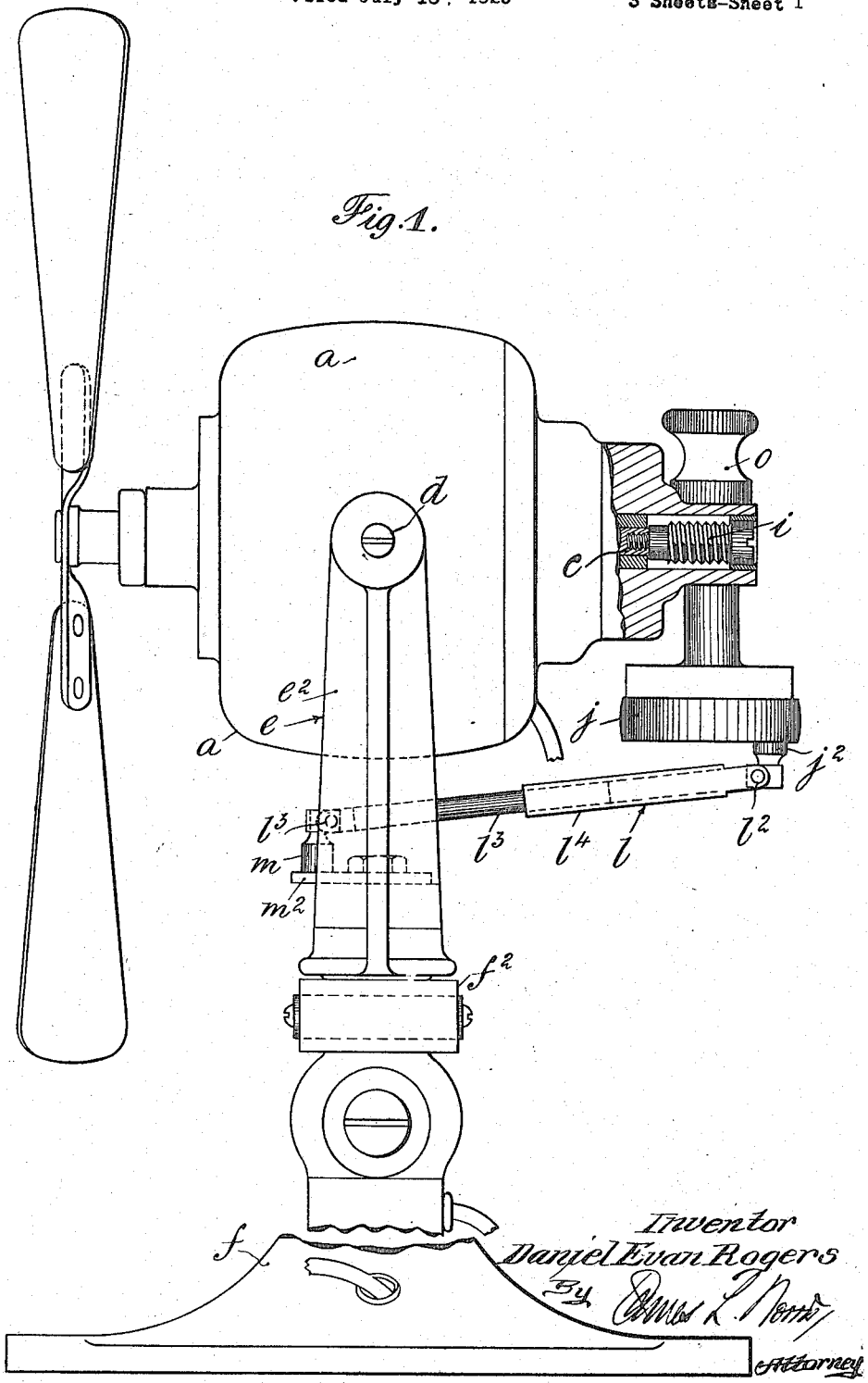

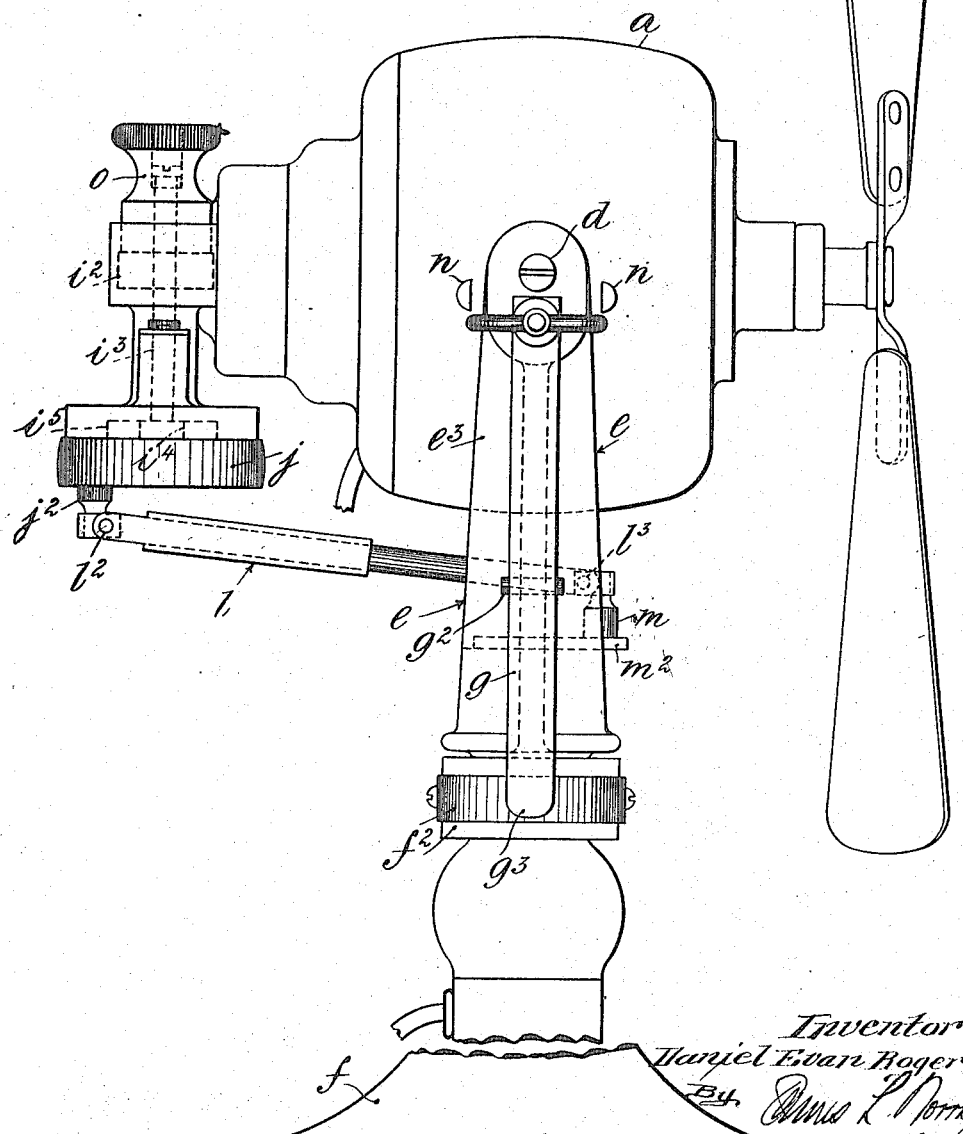

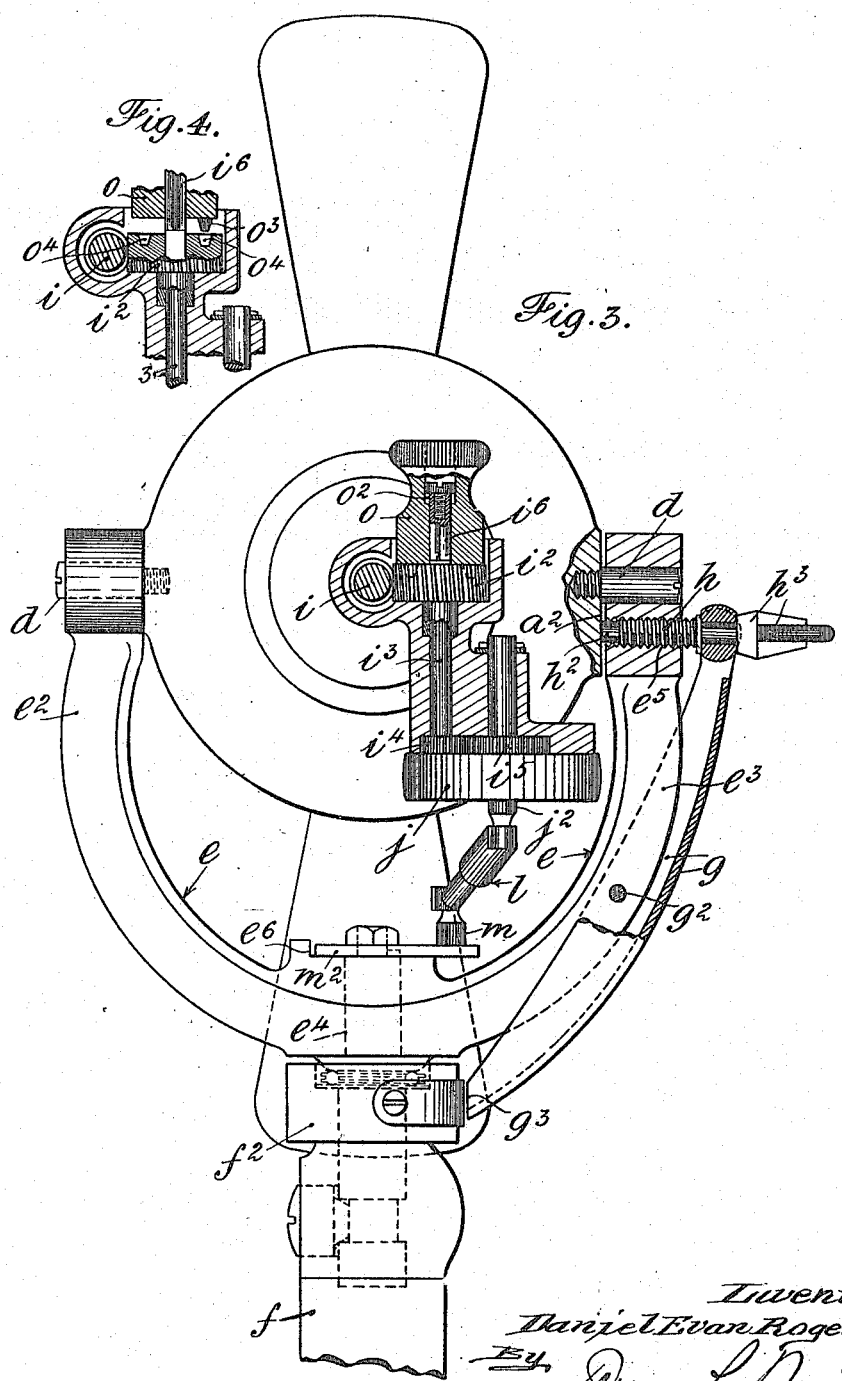

1,517,168

UNITED STATES PATENT OFFICE.

DANIEL EVAN ROGERS, OF LONDON, ENGLAND, ASSIGNOR TO VERITYS LIMITED, OF BIRMINGHAM, ENGLAND, A REGISTERED BRITISH COMPANY.

OSCILLATING FAN.

Application filed July 18, 1923. Serial No. 652,440.

*To all whom it may concern:*

Be it known that I, DANIEL EVAN ROGERS, subject of the King of Great Britain, residing at 31 King Street, Covent Garden, London, England, and also of Aston, Birmingham, England, have invented certain new and useful Improvements in Oscillating Fans, of which the following is a specification.

This invention relates to an oscillating electric fan, which, in addition to rotating will oscillate in two directions substantially at a right angle to one another. The same gear serves to automatically effect both oscillating movements from the rotation of the fan wheel shaft and combines therewith hand operated change-over mechanism whereby the direction of oscillation may be controlled. The change over is accomplished without stopping the revolution of the fan wheel, and preferably by one hand operated movement, for which latter a first order lever carrying a clamping screw may be used.

A novel feature of this invention is a connecting rod, which is self-adjusting as to length and which connects a crank portion of the oscillating gear to a fixed part of the bracket or pedestal. Said connecting rod may be formed of telescoping parts frictionally engaging one another.

A hand operated clutch is provided to connect and disconnect the oscillating gear from the fan wheel shaft in order to stop the oscillation.

A desirable form of the invention is represented by the accompanying drawings wherein:

Figs. 1 and 2 are reverse side elevations of as much of the fan as is necessary to clearly illustrate the invention.

Fig. 3 is a rear view, partly in section.

Fig. 4 is a detail of the worm gearing and clutch.

The casing $a$ within which the motor is mounted and through which the fan wheel shaft $c$ extends, is substantially of the usual construction and is mounted to rock upon trunnions $d$, $d$ having bearings within the branches $e^2$, $e^3$ of a bifurcated frame $e$ mounted to partly rotate upon a bracket or pedestal $f$. $f^2$ is a collar fixed to the bracket or pedestal, and $e^4$ is a rigid peg rising from the pedestal and over which the bifurcated frame $e$ is mounted to freely partly revolve. Fulcrumed at $g^2$ to the branch $e^3$ of the bifurcated frame is a first order lever $g$ carrying at the end of its one arm a set or clamping screw $h$ and having the end $g^3$ of its other arm adapted to impinge against the collar $f^2$ with considerable friction. Said set screw $h$ is pivoted within the end of the lever and engages a screw box $e^5$ in the branch $e^3$ and its end $h^2$ is adapted to grip the side facing $a^2$ of the motor casing $a$. The set screw $h$ may be manually operated through the medium of the wing nut-like head $h^3$. The action of this lever $g$ and set screw is such that when the screw $h$ impinges against the facing $a^2$ the end $g^3$ of the lever is free of the collar $f^2$, and when the end of the screw is free of the facing the end of the lever grips the collar.

Rigidly attached to the rear end of the fan wheel shaft $c$ is a worm $i$ to revolve concentrically with said shaft. Within an extension of the casing $a$ is mounted a worm wheel $i^2$ to gear with a worm and drive a shaft $i^3$, which by a reducing toothed gear $i^4$, $i^5$, revolves a crank plate $j$ which is therefore carried by said extension of the casing $a$.

To the crank or eccentric pin $j^2$ of this crank plate is jointedly connected one end $l^2$ of a telescopic connecting rod $l$, whose other end is jointedly connected at $l^3$ to a peg $m$ carried by an attachment plate $m^2$, fixed to the upright peg $e^4$ upon which the frame $e$ is mounted to partly revolve. This connecting rod is formed of two telescoping parts $l^3$, $l^4$, frictionally connected only, and adapted to move within and over the other to lengthen or shorten the connecting rod and thus permit said connecting rod to accommodate itself to the varying oscillating movements of the casing $a$ within the frame $e$, and of the frame $e$ about the peg $e^4$, the friction between the telescoping parts $l^3$, $l^4$, being sufficient to force the oscillating movements from the peg $m$ carried by the attachment plate $m^2$, but insufficient to prevent the length of the connecting rod from being adjusted by revolution of the crankplate, it being understood that if the bifurcated frame $e$ is held by the lever $g$ against part revolution on the pedestal, the casing $a$ and the parts it carries may oscillate on the trunnions $d$ within the frame $e$ and that, if the casing $a$ is held against oscillation, the bifurcated frame $e$ is partly revolved about the peg $e^4$.

The oscillation of the casing $a$ within the bifurcated frame $e$ is limited by stops $n, n$ on the casing which contact with the branch $e^3$ of the frame, while the part revolution of the bifurcated frame $e$ about the peg $e^4$ is limited by stop shoulders, such as $e^6$, of the frame coming into contact with the longitudinal edges of the fixed attachment plate $m^2$. The oscillating movements therefore emanate from the attachment plate $m^2$ through the connecting rod $l$ and the crank plate $j$, within the limits of the stops $n$ and $e^6$.

A hand operated member $o$ is carried by an extension $i^6$ of the shaft $i^3$, upon which the worm wheel $i^2$ is loosely mounted. This extension $i^6$ of the shaft $i^3$ is angular in cross-section and the interior of the member $o$ is correspondingly shaped. The member $o$ slides upon the extension within the limits of the space $o^2$, and upon its underside carries a rigid peg $o^3$ to engage one of a number of corresponding sinkings $o^4$ within the upper face of the worm wheel $i^2$, so that said worm wheel drives the shaft $i^3$ only through the member $o$, which slides friction-tight upon the shaft extension $i^6$. When the member $o$ is disengaged from the worm wheel said worm wheel revolves freely on the shaft $i^3$ without imparting motion to said shaft, so that by said disengagement any oscillating movement of the fan is stopped.

It will be clear from the drawings that the fan wheel shaft $c$ constantly drives the worm $i$, and that this worm constantly drives the worm wheel $i^2$, and that the shaft $i^3$ is only driven when the clutch member $o$ is in engagement with the worm wheel. The shaft $i^3$ drives the toothed wheels $i^4$, $i^5$ and the latter the crank plate $j$, from which the connecting rod $l$ forms an eccentric attachment to the fixed plate $m^2$. If the clamping pin $h$ is screwed up against the facing $a^2$ of the casing $a$ the oscillating movement is from the part revolution of the bifurcated frame $e$, whereas if said clamping screw is unscrewed clear of the facing $a^2$ the end $g^3$ of the lever $g$ grips the collar $f^2$ to prevent the oscillation of the bifurcated frame about the peg $e^4$ and to admit of the casing $a$ oscillating upon its trunnions within said bifurcated frame.

Having now described my invention what I claim and desire to secure by Letters Patent is:—

1. An electrically driven oscillating fan, comprising a pedestal, a frame mounted for rotation on said pedestal, a casing mounted to rock in said frame on an axis at an angle to the axis of rotation of said frame on said pedestal, a fan shaft rotatable in said casing, a crank carried by the casing and actuated by said fan shaft, means operable to secure said casing against rocking movement in said frame or to secure said frame against rotation on said pedestal, and means connecting said crank to said pedestal at a point eccentric to the axis of rotation of said frame, said connecting means comprising a plurality of parts longitudinally adjustable relatively to one another by the crank either when the casing is secured against rocking movement or the frame is secured against rotation.

2. An electrically driven oscillating fan, comprising a pedestal, a frame mounted for rotation on said pedestal, a casing mounted to rock in said frame on an axis at an angle to the axis of rotation of said frame on said pedestal, a fan shaft rotatable in said casing, a crank carried by the casing and actuated by said fan shaft, means operable to secure said casing against rocking movement in said frame or to secure said frame against rotation on said pedestal, and means connecting said crank to said pedestal eccentrically to the axis of rotation of said frame and adapted, when said casing is secured against rocking movement with respect to said frame, to cause said frame to oscillate on said pedestal and, when said frame is secured against rotation on said pedestal, to cause said casing to rock with respect to said frame, said means comprising a plurality of frictionally interengaging telescopic parts longitudinally adjustable with relation to one another by the rotation of said crank.

3. An electrically driven oscillating fan according to claim 1, wherein the means for securing the casing against rocking movement in the frame or to secure the frame against rotation on the pedestal is carried by the frame and is manually shiftable to engage either the casing or the pedestal.

4. An electrically driven oscillating fan according to claim 1, wherein the means for securing the casing against rocking movement in the frame or to secure the frame against rotation on the pedestal comprises a lever pivoted to the frame and having its opposite ends shiftable into engagement, respectively, with the casing and with the pedestal.

In testimony whereof I have hereunto set my hand.

DANIEL EVAN ROGERS.